US007508895B2

(12) United States Patent
Ishida

(10) Patent No.: US 7,508,895 B2
(45) Date of Patent: Mar. 24, 2009

(54) OVERSAMPLING APPARATUS, DECODING LSI CHIP, AND OVERSAMPLING METHOD

(75) Inventor: Atsushi Ishida, Hamamatsu (JP)

(73) Assignee: Yamaha Corporation, Hamamatsu-Shi (JP)

( * ) Notice: Subject to any disclaimer, the term of this patent is extended or adjusted under 35 U.S.C. 154(b) by 589 days.

(21) Appl. No.: 11/254,655

(22) Filed: Oct. 19, 2005

(65) Prior Publication Data

US 2006/0083342 A1 Apr. 20, 2006

(30) Foreign Application Priority Data

Oct. 20, 2004 (JP) ............................. 2004-305572

(51) Int. Cl.
*H04L 7/00* (2006.01)
*H04L 25/00* (2006.01)
*H04L 25/40* (2006.01)

(52) U.S. Cl. .......................... 375/372; 710/52; 710/53; 710/56

(58) Field of Classification Search ................. 375/372; 710/52–57

See application file for complete search history.

(56) References Cited

U.S. PATENT DOCUMENTS

2002/0122518 A1 * 9/2002 Yasuda et al. ............... 375/372

FOREIGN PATENT DOCUMENTS

JP 2004-012967 1/2004
JP 2004-271982 9/2004

* cited by examiner

*Primary Examiner*—Curtis B Odom
(74) *Attorney, Agent, or Firm*—Morrison & Foerster LLP

(57) ABSTRACT

An oversampling system (oversampling apparatus), a decoding LSI chip, and an oversampling method capable of decreasing the memory capacity of an output buffer used to oversample and output decoded data for digital audio.

10 Claims, 7 Drawing Sheets

STATE FOR FIRST HALF OF FRAME N

STATE FOR FIRST HALF OF FRAME N

OVERSAMPLING APPARATUS, DECODING LSI CHIP, AND OVERSAMPLING METHOD

BACKGROUND OF THE INVENTION

1. Technical Field

The present invention relates to an oversampling system, a decoding LSI chip, and an oversampling method for decoding and then oversampling digital audio compressed in units of frames. More specifically, the present invention relates to an oversampling system, a decoding LSI chip, and an oversampling method capable of decreasing the memory capacity of an output buffer used to oversample decoded data.

2. Related Art

Recently, the digital audio technology often uses the MPEG2 AAC (Advanced Audio Coding) 5.1 channel as MPEG audio. Reproduction of its contents needs to decode MPEG audio data. Decoding the MPEG audio data generates PCM audio data. In many cases, after oversampling the PCM audio data, DA conversion of the oversampled data is performed.

FIG. 6 shows a conventional example of oversampling after decoding performed on a dedicated LSI chip. The following describes an example of decoding to perform MPEG2 AAC 5.1 channel decoding and then double oversampling.

In FIG. 6, a dedicated LSI chip 100 is composed of a DSP and has an AAC decoding function and an oversampling function. An AAC decoder 101 receives an input stream signal (AAC bit stream signal) and performs decoding a frame by frame basis. An oversampling section 102 oversamples a decoding result and stores it in an output buffer 110.

The AAC decoder 101 performs frame-based decoding and temporarily writes data of 1,024 words (samples) per channel to the output buffer 110. The oversampling section 102 double oversamples the decoded data (PCM audio data) of 1,024 samples per channel that is decoded by the AAC decoder 101, and is temporarily written to the output buffer 110. The oversampling section 102 writes the data as PCM audio data of 2,048 words per frame to the output buffer 110.

The output buffer 110 is provided with an output buffer area A and an output buffer area B. Accordingly, the output buffer 110 contains:

"a number of decoded output samples×2 (areas A and B)×2 (double oversampling)" per channel. In the case of 5.1 channels, the output buffer 110 has the memory capacity of:

"6 (channels)×1,024 (the number of samples)×2 (areas A and B)×2 (double oversampling)=24,576 words".

FIG. 7 illustrates operations of the output buffer 110 in FIG. 6 according to a conventional example.

At the beginning of processing a current frame N as shown in FIG. 7(*a*), the output buffer area A of the output buffer 110 records a result of oversampling of a preceding frame N−1 (2,048 words/channel) for 5.1 channels such as L, R, LS, RS, C, and LEF. Frame N is subject to a process of writing the oversampling result to the output buffer area B (2,048 words/channel) and outputting data from the output buffer area A to the outside (DAC and the like) of the dedicated LSI chip.

In FIG. 7(*b*), the output buffer area A for each channel contains data which is stored in the earlier output buffer area B. The output buffer area B (earlier output buffer area A) is empty and will contain an oversampling result for the next frame N+1. This example uses the cyclic buffer configuration that shifts a point (address) to start outputting each channel data to the higher order for 2,048 words.

The above-mentioned procedure is repeated to sequentially output data for frames N, N+1, N+2, and so on to the outside.

FIGS. 7(*c*) and 7(*d*) show timings for decoding and oversampling. As shown in FIG. 7(*c*), while data is output from the preceding frame N−1, the next frame N is decoded, and then the decoded data of the frame N is oversampled successively. An oversampling result (oversampled data) is written to the output buffer area B.

There has been described the conventional AAC decoding and oversampling processes using the dedicated LSI chip. According to the conventional example, however, each channel requires the buffer memory capacity four times as much as the number of data samples.

A conventional-art document (e.g., see patent document 1) related to the present invention discloses the following configuration. That is, a DSP processing result is written to a double-buffered output buffer that cyclically changes write and read modes. The DSP processing result is read at a specified sampling cycle and is output to the outside.

[Patent document 1]

Japanese Patent Application Laid-Open Publication No. 2004-12967

SUMMARY OF THE INVENTION

The present invention has been made in consideration of the foregoing. It is therefore an object of the present invention to provide an oversampling system (oversampling apparatus), a decoding LSI chip, and an oversampling method capable of decreasing the memory capacity of an output buffer used to oversample and output decoded data for digital audio. It should be noted that the present invention aims at decreasing the output buffer's memory capacity needed for oversampling and therefore the invention differs from the prior art disclosed in the patent document 1 as to its premise, objects, and configurations.

The present invention has been made in consideration of the foregoing. An oversampling apparatus according to the present invention is designed for oversampling decoded data a frame by frame basis at an oversampling ratio of α, and outputting the oversampled data a frame by frame basis. The inventive oversampling apparatus comprises: an output buffer that has a memory capacity α+1 times as much as one frame of the decoded data, such that the output buffer is divided into memory areas 1, 2, . . . , α and α+1 in ascending order of addresses for use; a first portion that operates during a first time slot sharing (α−1)/α of a time length of a current frame N for writing decoded data of the current frame N into the memory area α+1, and for allowing the output buffer to output a first part of oversampled data of a preceding frame N−1 which has been previously written in the memory areas 1 to α−1 so that the memory areas 1 to α−1 are made free; a second portion that operates during a second time slot sharing 1/α of the time length of the current frame N for reading the decoded data of the current frame N written in the memory area α+1 of the output buffer so that the memory area α+1 is made free and the read data of the current frame N is oversampled, and writing the oversampled data of the current frame N into the free memory area α+1 and the free memory areas 1 to α−1, and further allowing the output buffer to output a second part of the oversampled data of the preceding frame N−1 which has been previously written in the memory area α, so that the memory area α is made free for writing of decoded data of a succeeding frame N+1; and a third portion that controls the output buffer to shift the addresses of the memory areas 1 to α+1 in cyclic manner while the first and second portions sequentially repeat writing and reading of the decoded data, writing of the oversampled data, and outputting of the oversampled data from the output buffer with respect to the succeeding frames N+1, N+2, and so on.

In this manner, the output buffer can be efficiently used. It is possible to decrease the memory capacity of the output buffer used to oversample the decoded data in digital audio. During double oversampling ($\alpha$=2), for example, the output buffer's memory capacity can be saved 25% compared to conventional examples.

Another oversampling apparatus according to the present invention is designed for oversampling decoded data composed of a plurality of channels, a frame by frame basis, at an oversampling ratio of $\alpha$, and outputting the oversampled data composed of the plurality of the channels, a frame by frame basis. The inventive oversampling apparatus comprises: an output buffer that has a memory capacity $\alpha$+1 times as much as one frame of the decoded data composed of the plurality of the channels, such that the output buffer is divided into a plurality of memory areas which are sequentially allocated to the plurality of the channels, and that each memory area of each channel is divided into sub memory areas 1, 2, . . . , $\alpha$ and $\alpha$+1 in ascending order of addresses for use; a first portion that operates during a first time slot sharing ($\alpha$−1)/$\alpha$ of a time length of a current frame N for writing decoded data of each channel of the current frame N into the sub memory area $\alpha$+1 of each channel, and for allowing the output buffer to output a first part of oversampled data of each channel of a preceding frame N−1 which has been previously written in the sub memory areas 1 to $\alpha$−1 of each channel so that the sub memory areas 1 to $\alpha$−1 are made free; a second portion that operates during a second time slot sharing 1/$\alpha$ of the time length of the current frame N for reading the decoded data of each channel of the current frame N written in the sub memory area $\alpha$+1 of each channel of the output buffer so that the sub memory area $\alpha$+1 is made free and the read data of each channel of the current frame N is oversampled, and writing the oversampled data of each channel of the current frame N into the free sub memory area $\alpha$+1 of each channel and the free sub memory areas 1 to $\alpha$−1 of each channel, and further allowing the output buffer to output a second part of the oversampled data of each channel of the preceding frame N−1 which has been previously written in the sub memory area $\alpha$ of each channel, so that the sub memory area $\alpha$ is made free for writing of decoded data of a succeeding frame N+1; and a third portion that controls the output buffer to shift the addresses of the plurality of the memory areas in cyclic manner while the first and second portions sequentially repeat writing and reading of the decoded data, writing of the oversampled data, and outputting of the oversampled data from the output buffer with respect to the succeeding frames N+1, N+2, and so on.

In this manner, the output buffer can be efficiently used even when oversampling multi-channel decoded data. It is possible to decrease the memory capacity of the output buffer used to oversample decoded data. During double oversampling, for example, the output buffer's memory capacity can be saved 25% compared to conventional examples.

A decoding LSI chip according to the present invention comprises a semiconductor chip and integrates a circuit of the oversampling apparatus as defined above.

Accordingly, it is possible to decrease the memory capacity needed for oversampling in the decoding LSI chip.

An oversampling method according to the present invention is provided for oversampling decoded data a frame by frame basis at an oversampling ratio of $\alpha$, and outputting the oversampled data a frame by frame basis from an output buffer which has a memory capacity $\alpha$+1 times as much as one frame of the decoded data, such that the output buffer is divided into memory areas 1, 2, . . . , $\alpha$ and $\alpha$+1 in ascending order of addresses for use. The inventive oversampling method comprises: a first process that is performed during a first time slot sharing ($\alpha$−1)/$\alpha$ of a time length of a current frame N for writing decoded data of the current frame N into the memory area $\alpha$+1, and for allowing the output buffer to output a first part of oversampled data of a preceding frame N−1 which has been previously written in the memory areas 1 to $\alpha$−1 so that the memory areas 1 to $\alpha$−1 are made free; a second process that is performed during a second time slot sharing 1/$\alpha$ of the time length of the current frame N for reading the decoded data of the current frame N written in the memory area $\alpha$+1 of the output buffer so that the memory area $\alpha$+1 is made free and the read data of the current frame N is oversampled, and writing the oversampled data of the current frame N into the free memory area $\alpha$+1 and the free memory areas 1 to $\alpha$−1, and further allowing the output buffer to output a second part of the oversampled data of the preceding frame N−1 which has been previously written in the memory area $\alpha$, so that the memory area $\alpha$ is made free for writing of decoded data of a succeeding frame N+1; and a third process that is performed to control the output buffer to shift the addresses of the memory areas 1 to $\alpha$+1 in cyclic manner while the first and second processes are sequentially performed to repeat writing and reading of the decoded data, writing of the oversampled data, and outputting of the oversampled data from the output buffer with respect to the succeeding frames N+1, N+2, and so on.

In this manner, the output buffer can be efficiently used. It is possible to decrease the memory capacity of the output buffer used to oversample decoded data in digital audio. During double oversampling, for example, the output buffer's memory capacity can be saved 25% compared to conventional examples.

Another oversampling method according to the present invention is provided for oversampling decoded data composed of a plurality of channels, a frame by frame basis, at an oversampling ratio of $\alpha$, and outputting the oversampled data composed of the plurality of the channels, a frame by frame basis, from an output buffer which has a memory capacity $\alpha$+1 times as much as one frame of the decoded data composed of the plurality of the channels, such that the output buffer is divided into a plurality of memory areas which are sequentially allocated to the plurality of the channels, and that each memory area of each channel is divided into sub memory areas 1, 2, . . . , $\alpha$ and $\alpha$+1 in ascending order of addresses for use. The inventive oversampling method comprises: a first process that is performed during a first time slot sharing ($\alpha$−1)/$\alpha$ of a time length of a current frame N for writing decoded data of each channel of the current frame N into the sub memory area $\alpha$+1 of each channel, and for allowing the output buffer to output a first part of oversampled data of each channel of a preceding frame N−1 which has been previously written in the sub memory areas 1 to $\alpha$−1 of each channel so that the sub memory areas 1 to $\alpha$−1 are made free; a second process that is performed during a second time slot sharing 1/$\alpha$ of the time length of the current frame N for reading the decoded data of each channel of the current frame N written in the sub memory area $\alpha$+1 of each channel of the output buffer so that the sub memory area $\alpha$+1 is made free and the read data of each channel of the current frame N is oversampled, and writing the oversampled data of each channel of the current frame N into the free sub memory area $\alpha$+1 of each channel and the free sub memory areas 1 to $\alpha$−1 of each channel, and further allowing the output buffer to output a second part of the oversampled data of each channel of the preceding frame N−1 which has been previously written in the sub memory area α of each channel, so that the sub memory area α is made free for writing of decoded data of a succeeding frame N+1; and a third process that is performed to control the output buffer to shift the addresses of the plurality of the memory areas in cyclic manner while the first and second possesses are sequentially performed to repeat writing and reading of the decoded data, writing of the oversampled data, and outputting of the oversampled data from the output buffer with respect to the succeeding frames N+1, N+2, and so on.

In this manner, it is possible to decrease the memory capacity of the output buffer used to oversample decoded data even when oversampling multi-channel decoded data. During double oversampling, for example, the output buffer's memory capacity can be saved 25% compared to conventional examples.

The oversampling apparatus and the oversampling method according to the present invention make it possible to effectively use the output buffer. It is possible to decrease the memory capacity of the output buffer used to oversample decoded data in digital audio. During double oversampling, for example, the output buffer's memory capacity can be saved 25% compared to conventional examples.

The oversampling apparatus and the oversampling method according to the present invention make it possible to decrease the memory capacity of the output buffer used to oversample decoded data even when oversampling multi-channel decoded data. During double oversampling, for example, the output buffer's memory capacity can be saved 25% compared to conventional examples.

The decoding LSI chip according to the present invention is provided with any one of the above-mentioned oversampling systems. It is possible to decrease the. memory capacity needed for oversampling in the decoding LSI chip.

DETAILED DESCRIPTION OF THE INVENTION

The best mode for carrying out the present invention will be described in further detail with reference to the accompanying drawings.

[Configuration of an Oversampling System (Oversampling Apparatus)]

Figure 1:
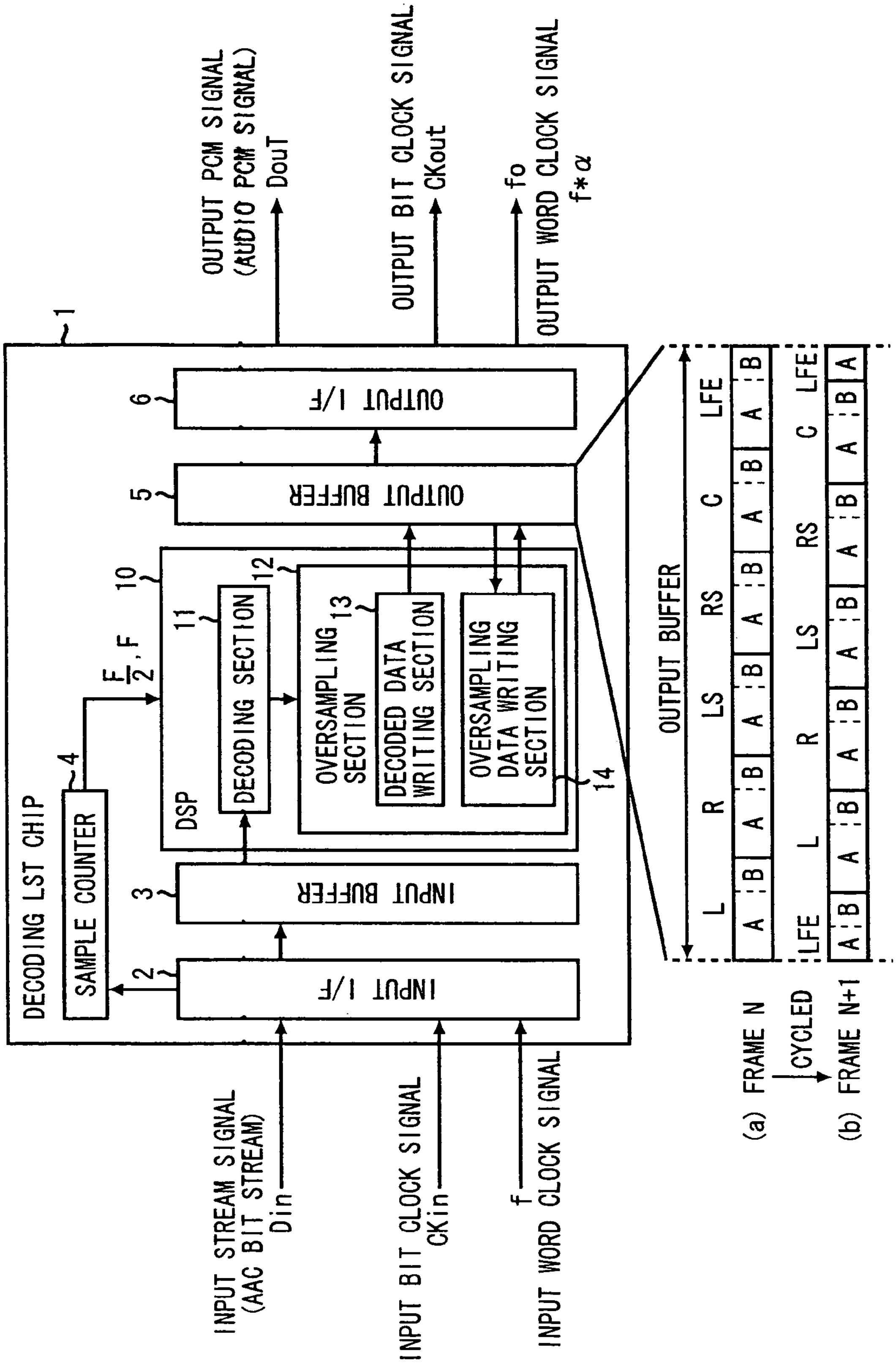
FIG. 1 is a diagram showing a configuration example of the oversampling system according to the present invention.

FIG. 1 exemplifies the configuration of an oversampling system according to the present invention. The example in FIG. 1 represents the configuration of a dedicated decoding LSI chip. This LSI example decodes an input stream signal (AAC bit stream signal) encoded in the MPEG2 AAC format, then oversamples the signal, and outputs that signal as an audio PCM (Pulse Code Modulation) signal.

In FIG. 1, reference numeral 1 denotes the whole of a decoding LSI chip; 2 denotes an input interface (input I/F); 3 denotes an input buffer; 4 denotes a sample counter; 5 denotes an output buffer; 6 denotes an output interface (output I/F); and 10 denotes a DSPW(Digital Signal Processor). The DSP 10 includes a decoding section 11 and an oversampling section 12. The oversampling section 12 includes a decoded data writing section 13 and an oversampling data writing section 14.

At the input side, an input stream signal Din is a bit stream signal obtained by sampling a 5.1-channel audio signal and encoding it according to MPEG2 AAC. Input stream signal Din contains time-divisional data for each channel. Input word clock signal f determines the sampling cycle of input stream signal Din. Input bit clock signal CKout determines the position of each bit in the input stream signal Din.

At the output side, an output PCM signal Dout is generated by oversampling decoded data (a signal obtained by decoding the MPEG2 AAC signal) and outputting the resulting data as an audio PCM signal. Output word clock fo determines the sampling cycle of output PCM signal Dout. The cycle of Output word clock fo is formulated as input word clock signal f×α (oversampling ratio). Output bit clock signal CKout determines the position of each bit in output PCM signal Dout.

In the above-mentioned configuration of the decoding LSI chip 1 according to the present invention, the input I/F 2 receives external input signals Din, CKin, and f and supplies these signals to the input buffer 3 and the sample counter 4. The input buffer 3 receives the input stream signal Din from the input I/F 2, and converts this signal into parallel data in units of frames and temporarily stores this data.

The sample counter 4 generates sampling timing from input word clock signal f and supplies the DSP 10 with information such as frame time (F) and half frame time (F/2).

The output buffer 5 stores the oversampled data and decoded data. The oversampled data stored in the output buffer 5 is output to the outside via the output I/F 6.

The output buffer 5 is provided with buffer areas A and B for each channel. The output buffer 5 as a whole constitutes a cyclic buffer or ring buffer. During double oversampling (α=2), for example, the output buffer 5 allows the read start position to shift so as to be configured as shown in FIG. 1(*a*) at the beginning of frame N and as shown in FIG. 1(*b*) at the beginning of frame N+1.

The memory capacity and specific operation examples of the output buffer 5 will be described later.

The decoding section 11 in the DSP 10 reads and decodes frame-based data recorded in the input buffer 3 to generate decoded data and supplies this data to the oversampling section 12.

Figure 2:
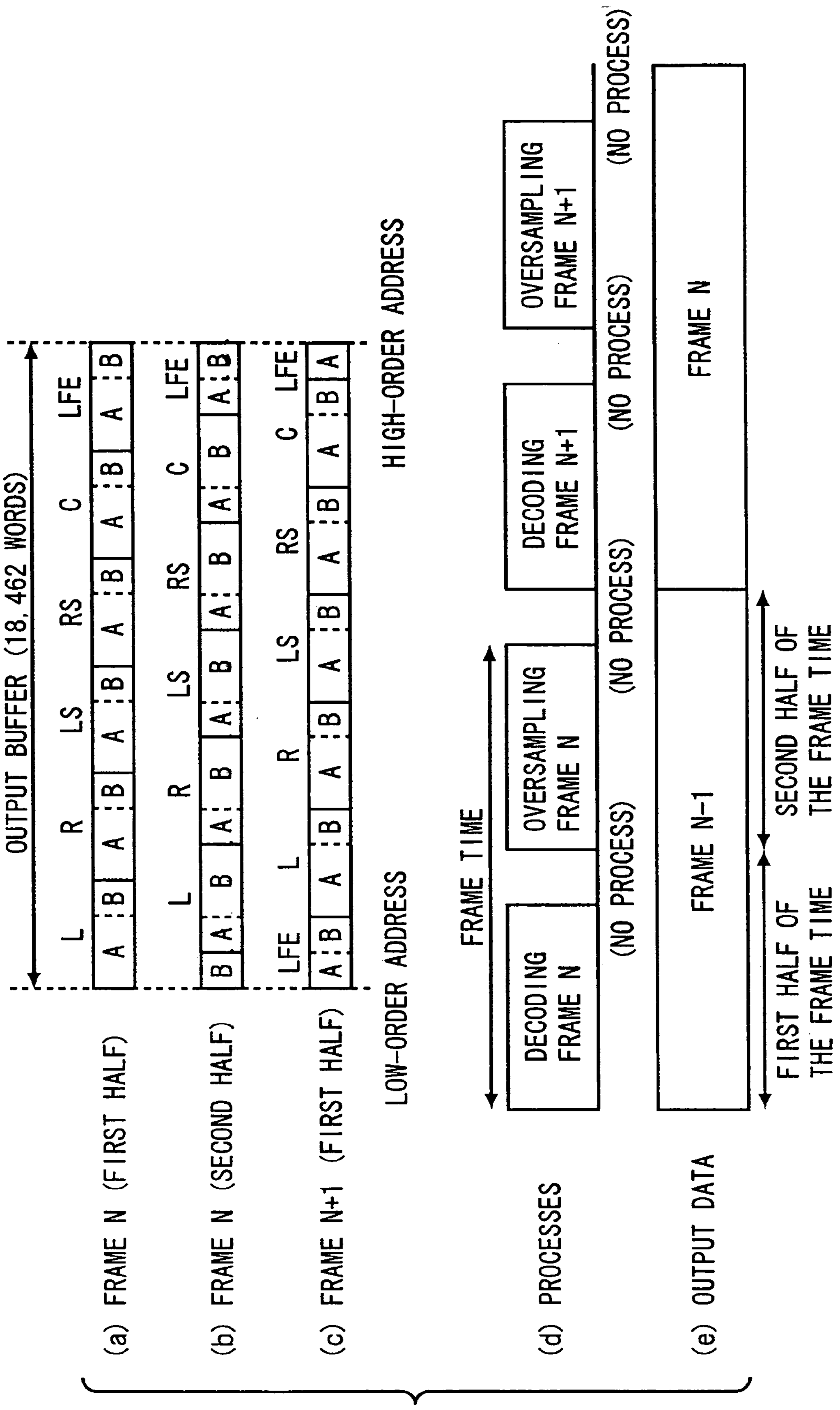
FIG. 2 is an explanatory diagram exemplifying oversampling system operations.

The decoded data writing section 13 in the oversampling section 12 receives the decoded data from the decoding section 11 and (temporarily) outputs it to the output buffer 5 during the first half of frame N. In this case, the decoded data is stored in the buffer area B corresponding to each channel during the first half of the frame N as shown in FIG. 2(*a*).

The oversampling data writing section 14 in the oversampling section 12 reads decoded data saved in the buffer area B of the output buffer 5, oversamples the data, and finally outputs it to the output buffer 5. In this case, the oversampled data is stored in the buffer area B during the second half of frame N as shown in FIG. 2(*b*). It is assumed that the oversampling process in the oversampling section 12 starts at the second half of the frame time (i.e., the amount of oversampling process is smaller than or equal to half the throughput of the LSI 1). The reason for it will be described later.

The output I/F 6 is provided with operation timing from the output word clock signal fo and outputs the oversampled signal recorded in the output buffer 5 as the output PCM signal Dout to the outside at a sampling cycle.

[Specific Operation Example]

With reference to FIG. 2, the following describes a specific operation example of the decoding LSI chip 1 as shown in FIG. 1. The following example describes MPEG2 AAC 5.1-channel decoding followed by double oversampling.

In this case, the capacity of the output buffer 5 is calculated as follows according to "the number of channels×the number of decoded output samples×(1+α)".

5.1 channels×1,024×(1+2)=18,432 words (samples)

Figure 3A:
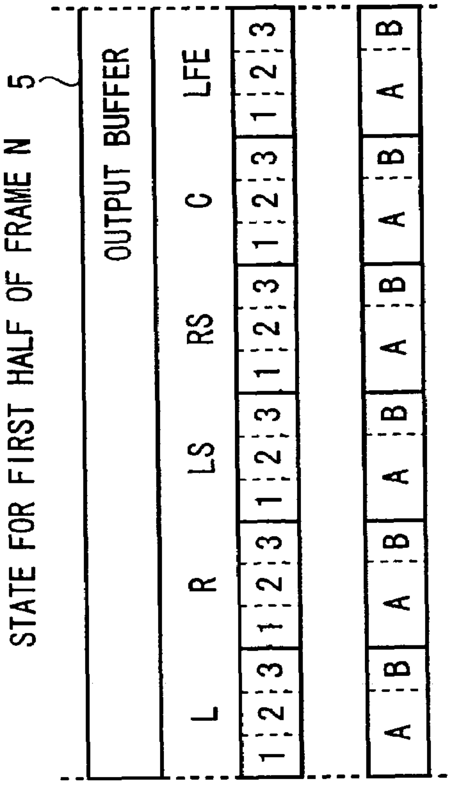
FIGS. 3(*a*) and 3(*b*) are an explanatory diagram of an output buffer.
Figure 3B:
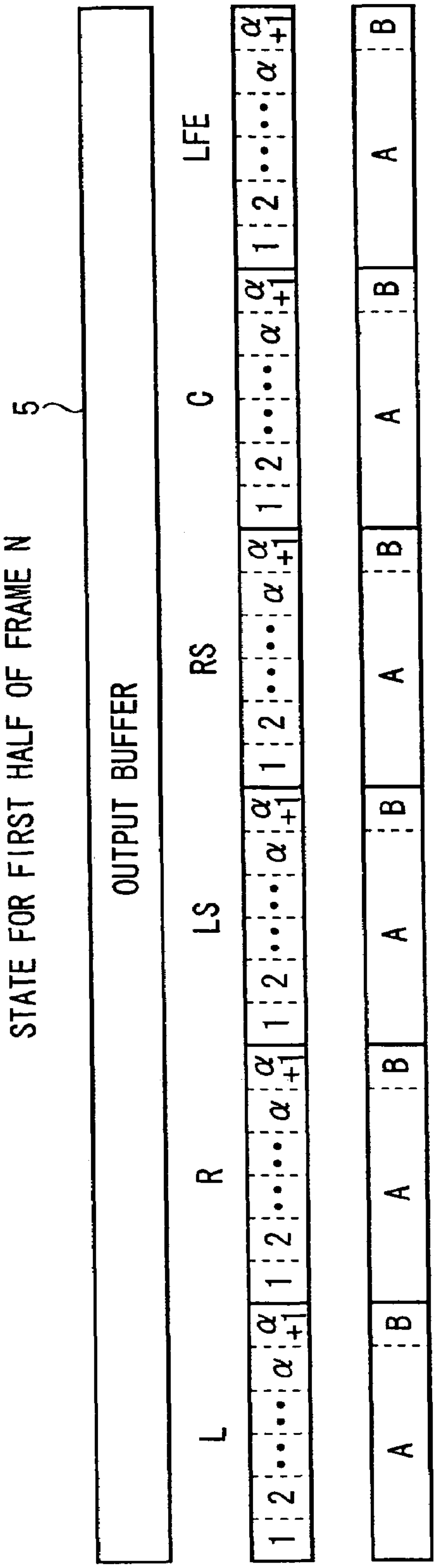

The output buffer 5 is provided with buffer areas A and B for each channel. The output buffer 5 as a whole constitutes a cyclic buffer. During double sampling (α=2), as shown in FIG. 3(*a*), the output buffer 5 contains a memory area that is allocated to each channel, and each area is divided into three (α+1) sub areas such as areas 1, 2, and 3 at the first half of frame N, the output buffer maintains a state where areas 1 and 2 correspond to buffer area A and area 3 corresponds to buffer area B (the state as shown in FIG. 2(*a*)).

For the first half time slot of the time length of a current frame N as shown in FIG. 2(*a*), the system writes a decoding result (1,024 words of decoded data) to output buffer area B (1,024 words/channel) corresponding to each channel. The system outputs the previous frame's result (first half equivalent to 1,024 words out of 2,048 words/channel) from output buffer area A to the outside of the decoder.

When the system outputs data of 1,024 words for the first half part of the output buffer area A, the first half of the buffer area A for 1,024 words/channel becomes empty and made free. This free area is used as buffer area B for the second half time slot of the frame N. During the second half time slot of frame N, the output buffer 5 maintains a state as shown in FIG. 2(*b*). To enable the output buffer 5 to cycle, each channel's start address is shifted to the higher order for 1,024 words.

During the second half time slot of frame N as shown in FIG. 2(*b*), the system reads out the decoded data (1,024 words) recorded in buffer area B during the first half time slot of frame N. The system oversamples this read data. The system writes the oversampling result to output buffer B (2,048 words/channel). The system outputs the previous frame's result (second half equivalent to 1,024 words out of 2,048 words/channel) from output buffer area A to the outside.

According to the example shown in FIG. 2, the system oversamples the decoded data of frame N during the second half of the frame time as shown in FIGS. 2(*e*) and 2(*d*) (so as to wait until the first half of buffer area A becomes empty). When half the frame time is not reached at the completion of the AAC decode process, the system does not start the oversampling process until half the frame time is exceeded. When half the frame time is exceeded at the completion of the AAC decoding, the system restarts the oversampling process.

As mentioned above, when the decoded data oversampling system according to the present invention performs double oversampling after MPEG2 AAC 5.1-channel decoding, the capacity of the output buffer 5 requires "5.1 channels×1,024×(1+2)=18.432 words (samples)" according to "the number of channels×the number of decoded output samples×(1+α)". This saves the memory capacity 25% compared to 24,576 words of the conventional-example. Further increasing the sampling ratio α more decreases the memory capacity.

Figure 4:
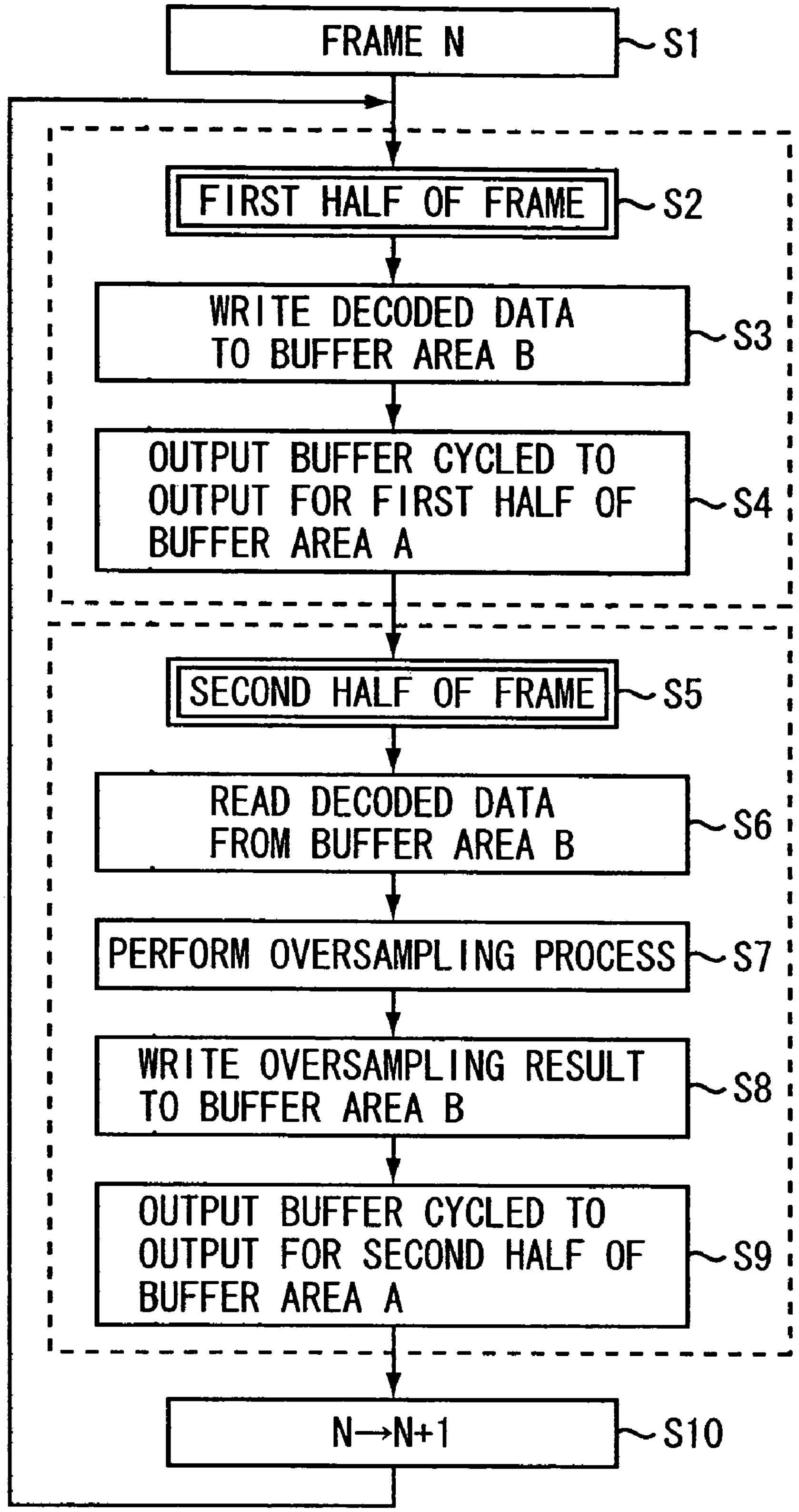
FIG. 4 is a flowchart showing a process performed in the oversampling system.

FIG. 4 is a flowchart showing the specific operation example shown in FIG. 2. The following describes the flow of process with reference to FIG. 4.

First, it is determined to process data in current frame N (step S1).

The process starts for the first half time spot of frame N (step S2). During the first half time slot of frame N, the process writes a decoding result (1,024 words of decoded data) to output buffer area B (1,024 words/channel) (step S3).

The process outputs a first half part of the result of the previous frame N−1 (1,024 words equivalent to the first half of 2,048 words/channel) from output buffer area A to the outside of the decoding LSI chip (step S4).

The process then starts for the second half time slot of frame N (step S5).

For the second half time slot of frame N, the process reads the decoded data (1,024 words) recorded at step S3 from buffer area B (step S6).

The process oversamples this decoded data (step S7). The process writes the oversampling result to output buffer B (2,048 words/channel) (step S8).

The process outputs the remaining second half part of the result of the previous frame N−1 (1,024 words equivalent to the second half of 2,048 words/channel) from the output buffer area A to the outside of the decoding LSI chip.

The process updates frame N to frame N+1 to repeat the above-mentioned steps.

Figure 5A:
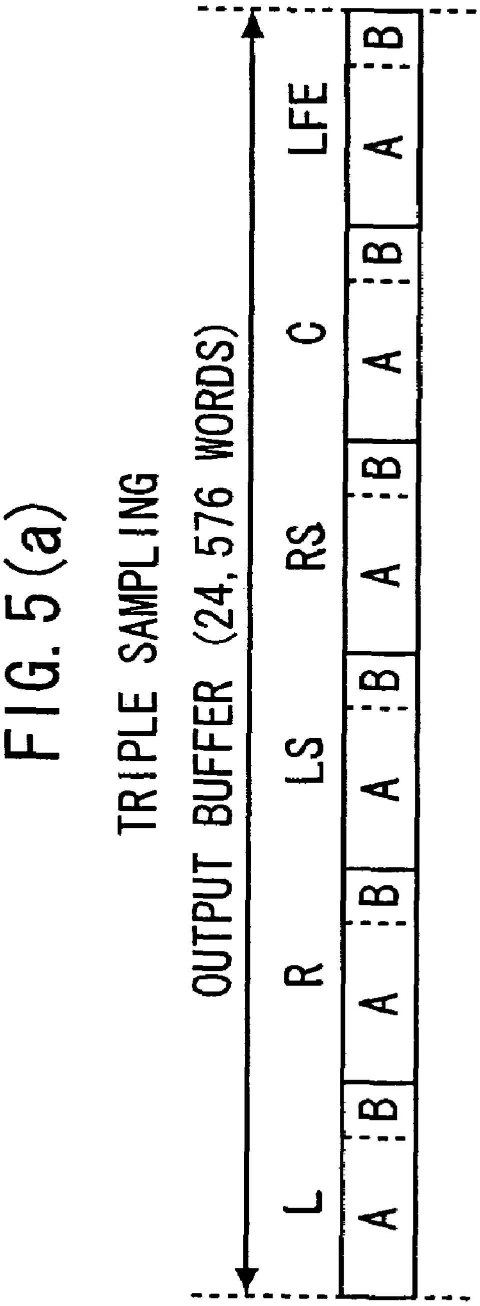
FIGS. 5(*a*) and 5(*b*) are a diagram showing output buffer states for triple and quadruple oversampling, respectively.
Figure 5B:
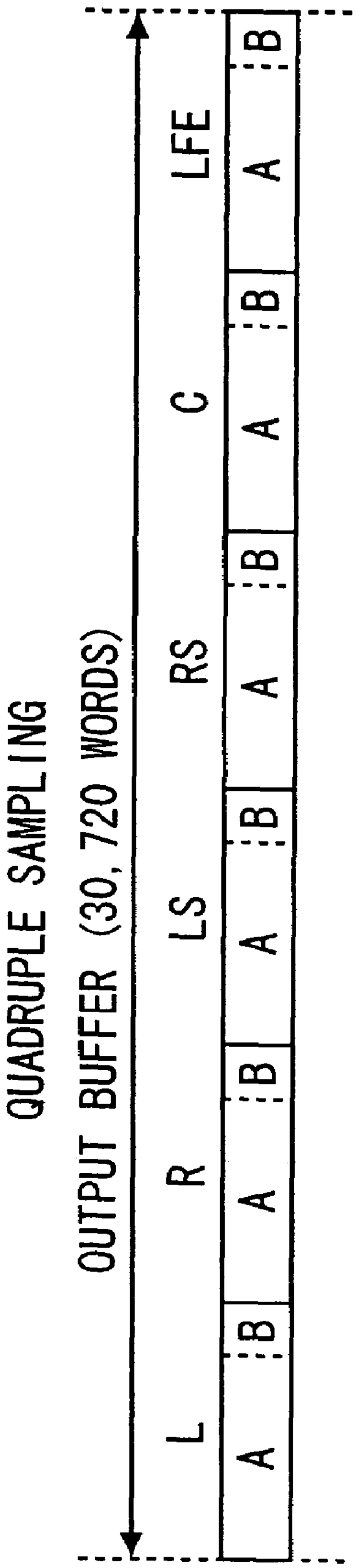
Figure 6:
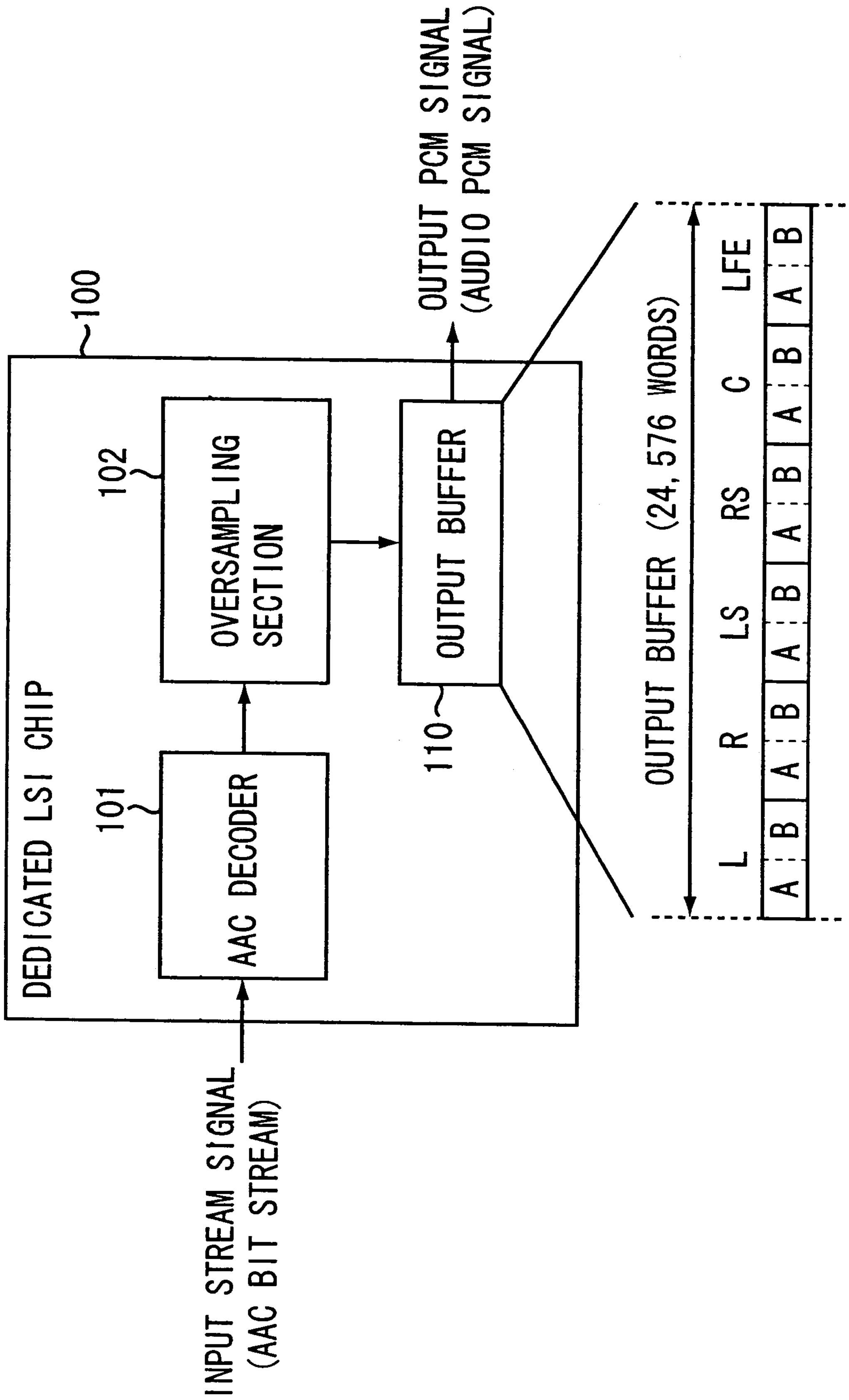
FIG. 6 is a diagram showing the configuration of a conventional oversampling system.
Figure 7:
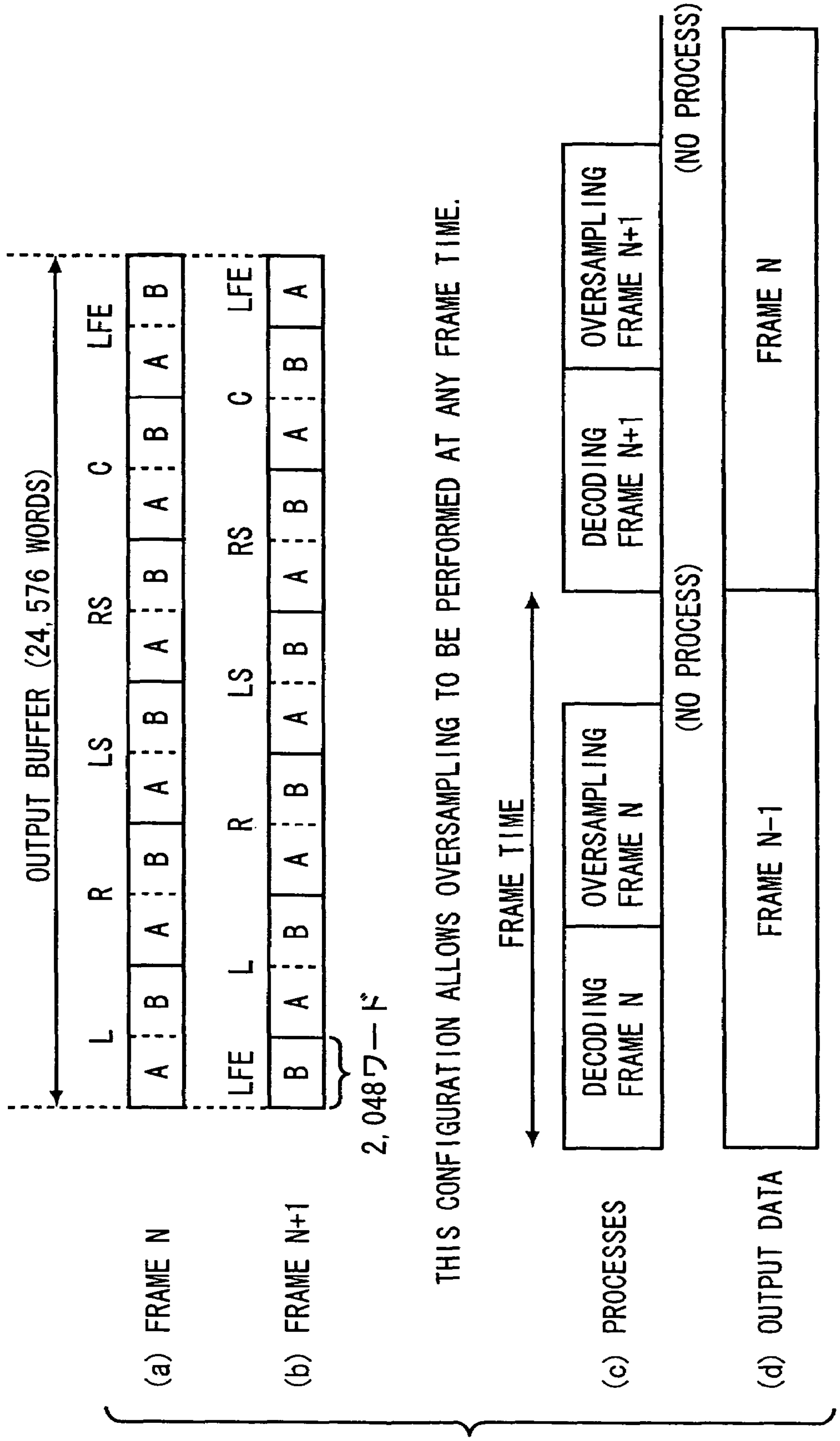
FIG. 7 is an explanatory diagram showing operations of a conventional output buffer.

FIG. 5 shows output buffer states for triple and quadruple oversampling. FIG. 5(*a*) shows an output buffer state during triple oversampling. FIG. 5(*b*) shows an output buffer state during quadruple oversampling.

When α is greater than or equal to 3, as shown in FIG. 3(*b*), the output buffer 5 is divided into (α+1) portions for each channel such as sub areas 1, 2, α, and α+1 for each channel. For the first time slot sharing (α−1)/(α of the time length of frame N, sub buffer areas 1 through α correspond to buffer area A. Sub buffer area α+1 corresponds to buffer area B. The subsequent operations are similar to those for α=2. However, there is a limitation on the timing to start oversampling after the lapse of (α−1)/α.

Namely, the inventive oversampling method is designed for oversampling decoded data composed of a plurality of channels, a frame by frame basis, at an oversampling ratio of α, and outputting the oversampled data composed of the plurality of the channels, a frame by frame basis, from an output buffer which has a memory capacity α+1 times as much as one frame of the decoded data composed of the plurality of the channels, such that the output buffer is divided into a plurality of memory areas which are sequentially allocated to the plurality of the channels, and that each memory area of each channel is divided into sub memory areas 1, 2, . . . , α and α+1 in ascending order of addresses for use.

First, second and third processes are performed according to the inventive oversampling method. Namely, the first process is performed during a first time slot sharing (α−1)/α of a time length of a current frame N for writing decoded data of each channel of the current frame N into the sub memory area α+1 of each channel, and for allowing the output buffer to output a first part of oversampled data of each channel of a preceding frame N−1 which has been previously written in the sub memory areas 1 to α−1 of each channel so that the sub memory areas 1 to α−1 are made free. The second process is performed during a second time slot sharing 1/α of the time length of the current frame N for reading the decoded data of each channel of the current frame N written in the sub memory area α+1 of each channel of the output buffer so that the sub memory area α+1 is made free and the read data of each channel of the current frame N is oversampled, and writing the oversampled data of each channel of the current frame N into the free sub memory area α+1 of each channel and the free sub memory areas 1 to α−1 of each channel, and further allowing the output buffer to output a second part of the oversampled data of each channel of the preceding frame N−1 which has been previously written in the sub memory area α of each channel, so that the sub memory area α is made free for writing of decoded data of a succeeding frame N+1. The third process is performed to control the output buffer to shift the addresses of the plurality of the memory areas in cyclic manner while the first and second possesses are sequentially performed to repeat writing and reading of the decoded data, writing of the oversampled data, and outputting of the oversampled data from the output buffer with respect to the succeeding frames N+1, N+2, and so on.

While there has been described the embodiment of the present invention, it is to be distinctly understood that the oversampling system (oversampling apparatus) of the present invention is not limited to the above-mentioned examples but may be otherwise variously modified within the spirit and scope of the invention.

The present invention provides the effect capable of decreasing the memory capacity of the output buffer used to oversample decoded data in units of frames. Accordingly, the present invention is useful for oversampling systems, decoding LSI chips, and oversampling methods of audio signals.

What is claimed is:

1. An oversampling apparatus for oversampling decoded data on a frame by frame basis at an oversampling ratio of α, and outputting the oversampled data on a frame by frame basis, the oversampling apparatus comprising:

an output buffer that has a memory capacity α+1 times as much as one frame of the decoded data, such that the output buffer is divided into memory areas 1, 2, . . . , α and α+1 in ascending order of addresses for use;

a first portion that operates during a first time slot sharing (α−1)/α of a time length of a current frame N for writing decoded data of the current frame N into the memory area α+1, and for allowing the output buffer to output a first part of oversampled data of a preceding frame N−1 which has been previously written in the memory areas 1 to α−1 so that the memory areas 1 to α−1 are made free;

a second portion that operates during a second time slot sharing 1/α of the time length of the current frame N for reading the decoded data of the current frame N written in the memory area α+1 of the output buffer so that the memory area α+1 is made free and the read data of the current frame N is oversampled, and writing the oversampled data of the current frame N into the free memory area α+1 and the free memory areas 1 to α−1, and further allowing the output buffer to output a second part of the oversampled data of the preceding frame N−1 which has been previously written in the memory area α, so that the memory area α is made free for writing of decoded data of a succeeding frame N+1; and a third portion that controls the output buffer to shift the addresses of the memory areas 1 to α+1 in cyclic manner while the first and second portions sequentially repeat writing and reading of the decoded data, writing of the oversampled data, and outputting of the oversampled data from the output buffer with respect to the succeeding frames N+1, N+2, and so on.

2. The oversampling apparatus according to claim 1, further comprising a decoding section that decodes audio data inputted from an outside in an encoded form to provide the decoded data.

3. The oversampling apparatus according to claim 1, further comprising an oversampling portion that oversamples the decoded data at the oversampling ratio of α to provide the oversampled data containing sample points α times as much as the decoded data.

4. An oversampling apparatus for oversampling decoded data composed of a plurality of channels, on a frame by frame basis, at an oversampling ratio of α, and outputting the oversampled data composed of the plurality of the channels, on a frame by frame basis, the oversampling apparatus comprising:

an output buffer that has a memory capacity α+1 times as much as one frame of the decoded data composed of the plurality of the channels, such that the output buffer is divided into a plurality of memory areas which are sequentially allocated to the plurality of the channels, and that each memory area of each channel is divided into sub memory areas 1, 2, . . . , α and α+1 in ascending order of addresses for use;

a first portion that operates during a first time slot sharing (α−1)/α of a time length of a current frame N for writing decoded data of each channel of the current frame N into the sub memory area α+1 of each channel, and for allowing the output buffer to output a first part of oversampled data of each channel of a preceding frame N−1 which has been previously written in the sub memory areas 1 to α−1 of each channel so that the sub memory areas 1 to α−1 are made free;

a second portion that operates during a second time slot sharing 1/α of the time length of the current frame N for reading the decoded data of each channel of the current frame N written in the sub memory area α+1 of each channel of the output buffer so that the sub memory area α+1 is made free and the read data of each channel of the current frame N is oversampled, and writing the oversampled data of each channel of the current frame N into the free sub memory area α+1 of each channel and the free sub memory areas 1 to α−1 of each channel, and further allowing the output buffer to output a second part of the oversampled data of each channel of the preceding frame N−1 which has been previously written in the sub memory area α of each channel, so that the sub memory area α is made free for writing of decoded data of a succeeding frame N+1; and a third portion that controls the output buffer to shift the addresses of the plurality of the memory areas in cyclic manner while the first and second portions sequentially repeat writing and reading of the decoded data, writing of the oversampled data, and outputting of the oversampled data from the output buffer with respect to the succeeding frames N+1, N+2, and so on.

5. The oversampling apparatus according to claim 4, further comprising a decoding section that decodes audio data inputted from an outside in an encoded form to provide the decoded data.

6. The oversampling apparatus according to claim 4, further comprising an oversampling portion that oversamples the decoded data at the oversampling ratio of α to provide the oversampled data containing sample points α times as much as the decoded data.

7. A decoding LSI chip comprising a semiconductor chip and integrating a circuit of the oversampling apparatus as recited in claim 1 into the semiconductor chip.

8. A decoding LSI chip comprising a semiconductor chip and integrating a circuit of the oversampling apparatus as recited in claim 4 into the semiconductor chip.

9. An oversampling method of oversampling decoded data on a frame by frame basis at an oversampling ratio of α, and outputting the oversampled data on a frame by frame basis from an output buffer which has a memory capacity α+1 times as much as one frame of the decoded data, such that the output buffer is divided into memory areas 1, 2, . . . , α and α+1 in ascending order of addresses for use, the oversampling method comprising:

performing a first process during a first time slot sharing (α−1)/α of a time length of a current frame N for writing decoded data of the current frame N into the memory area α+1, and for allowing the output buffer to output a first part of oversampled data of a preceding frame N−1 which has been previously written in the memory areas 1 to α−1 so that the memory areas 1 to α−1 are made free;

performing a second process during a second time slot sharing 1/α of the time length of the current frame N for reading the decoded data of the current frame N written in the memory area α+1 of the output buffer so that the memory area α+1 is made free and the read data of the current frame N is oversampled, and writing the oversampled data of the current frame N into the free memory area α+1 and the free memory areas 1 to α−1, and further allowing the output buffer to output a second part of the oversampled data of the preceding frame N−1 which has been previously written in the memory area α, so that the memory area α is made free for writing of decoded data of a succeeding frame N+1; and performing a third process to control the output buffer to shift the addresses of the memory areas 1 to α+1 in cyclic manner while the first and second processes are sequentially performed to repeat writing and reading of the decoded data, writing of the oversampled data, and outputting of the oversampled data from the output buffer with respect to the succeeding frames N+1, N+2, and so on.

10. An oversampling method of oversampling decoded data composed of a plurality of channels, on a frame by frame basis, at an oversampling ratio of α, and outputting the oversampled data composed of the plurality of the channels, on a frame by frame basis, from an output buffer which has a memory capacity α+1 times as much as one frame of the decoded data composed of the plurality of the channels, such that the output buffer is divided into a plurality of memory areas which are sequentially allocated to the plurality of the channels, and that each memory area of each channel is divided into sub memory areas 1, 2, . . . , α and α+1 in ascending order of addresses for use, the oversampling method comprising:

performing a first process during a first time slot sharing (α−1)/α of a time length of a current frame N for writing decoded data of each channel of the current frame N into the sub memory area α+1 of each channel, and for allowing the output buffer to output a first part of oversampled data of each channel of a preceding frame N−1 which has been previously written in the sub memory areas 1 to α−1 of each channel so that the sub memory areas 1 to α−1 are made free;

performing a second process during a second time slot sharing 1/α of the time length of the current frame N for reading the decoded data of each channel of the current frame N written in the sub memory area α+1 of each channel of the output buffer so that the sub memory area α+1 is made free and the read data of each channel of the current frame N is oversampled, and writing the oversampled data of each channel of the current frame N into the free sub memory area α+1 of each channel and the free sub memory areas 1 to α−1 of each channel, and further allowing the output buffer to output a second part of the oversampled data of each channel of the preceding frame N−1 which has been previously written in the sub memory area α of each channel, so that the sub memory area α is made free for writing of decoded data of a succeeding frame N+1; and performing a third process to control the output buffer to shift the addresses of the plurality of the memory areas in cyclic manner while the first and second processes are sequentially performed to repeat writing and reading of the decoded data, writing of the oversampled data, and outputting of the oversampled data from the output buffer with respect to the succeeding frames N+1, N+2, and so on.

* * * * *